United States Patent
Kelkar et al.

(10) Patent No.: US 7,673,228 B2
(45) Date of Patent: Mar. 2, 2010

(54) DATA-DRIVEN ACTIONS FOR NETWORK FORMS

(75) Inventors: Amol S. Kelkar, Redmond, WA (US); Danny van Velzen, Redmond, WA (US); David Airapetyan, Kirkland, WA (US); Jonathan E. Rivers-Moore, Bellevue, WA (US); Ranjan Aggarwal, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 642 days.

(21) Appl. No.: 11/095,254

(22) Filed: Mar. 30, 2005

(65) Prior Publication Data

US 2006/0230338 A1      Oct. 12, 2006

(51) Int. Cl.
*G06F 17/21*      (2006.01)
(52) U.S. Cl. ................ 715/223; 715/221; 715/222; 715/224; 715/225
(58) Field of Classification Search .......... 715/221–225
See application file for complete search history.

(56) References Cited

U.S. PATENT DOCUMENTS

| | | | |
|---|---|---|---|
| 4,498,147 A | 2/1985 | Agnew et al. |
| 4,910,663 A | 3/1990 | Bailey |
| 4,926,476 A | 5/1990 | Covey |
| 5,140,563 A | 8/1992 | Thinesen |
| 5,228,100 A | 7/1993 | Takeda et al. |
| 6,251,273 B1 | 10/1993 | Betts et al. |
| 5,410,646 A | 4/1995 | Tondevold et al. |
| 5,438,659 A | 8/1995 | Notess et al. |
| 5,581,686 A | 12/1996 | Koppolo et al. |
| 5,664,133 A | 9/1997 | Malamud et al. |
| 5,704,029 A | 12/1997 | Wright, Jr. |
| 5,778,372 A | 7/1998 | Cordell et al. |
| 5,826,031 A | 10/1998 | Nielsen |
| 5,826,265 A | 10/1998 | Van Huben et al. |
| 5,845,122 A | 12/1998 | Nielsen et al. |
| 5,873,088 A | 2/1999 | Hayashi et al. |
| 5,905,492 A | 5/1999 | Straub et al. |
| 5,907,621 A | 5/1999 | Bachman et al. |
| 5,915,112 A | 6/1999 | Boutcher |
| 5,953,731 A | 9/1999 | Glaser |
| 6,012,066 A | 1/2000 | Discount et al. |
| 6,021,403 A | 2/2000 | Horvitz et al. |
| 6,031,989 A | 2/2000 | Cordell et al. |

(Continued)

FOREIGN PATENT DOCUMENTS

JP      10171662      6/1998

(Continued)

OTHER PUBLICATIONS

Lehton, A Dynamic User Interface for Document, Nov. 8, 2002, 134-141.

(Continued)

*Primary Examiner*—Joshua D Campbell

(57) ABSTRACT

Systems and/or methods are described that enable a data-driven action associated with altering a data instance of a network form without altering and/or having access to the data instance. These systems and/or methods, in one embodiment, render a result of a data-driven action for a network form without transforming the network form's data instance. In another embodiment, the systems and/or methods map a data-driven action to a view-centric logical representation of the electronic form.

16 Claims, 6 Drawing Sheets

U.S. PATENT DOCUMENTS

| | | | |
|---|---|---|---|
| 6,044,205 A | 3/2000 | Reed et al. | |
| 6,052,710 A | 4/2000 | Saliba et al. | |
| 6,057,837 A | 5/2000 | Hatakeda et al. | |
| 6,058,413 A | 5/2000 | Flores et al. | |
| 6,065,043 A | 5/2000 | Domenikos et al. | |
| 6,069,626 A | 5/2000 | Cline et al. | |
| 6,085,685 A | 7/2000 | Kraft et al. | |
| 6,088,679 A | 7/2000 | Barkley | |
| 6,096,096 A | 8/2000 | Murphy et al. | |
| 6,097,382 A | 8/2000 | Rosen et al. | |
| 6,105,012 A | 8/2000 | Chang et al. | |
| 6,167,523 A | 12/2000 | Strong | |
| 6,192,367 B1 | 2/2001 | Hawley et al. | |
| 6,219,423 B1 | 4/2001 | Davis | |
| 6,243,088 B1 | 6/2001 | McCormack et al. | |
| 6,272,506 B1 | 8/2001 | Bell | |
| 6,279,042 B1 * | 8/2001 | Ouchi | 709/240 |
| 6,282,709 B1 | 8/2001 | Reha et al. | |
| 6,292,941 B1 | 9/2001 | Jollands | |
| 6,311,221 B1 | 10/2001 | Raz et al. | |
| 6,314,415 B1 * | 11/2001 | Mukherjee | 706/47 |
| 6,336,214 B1 | 1/2002 | Sundaresan | |
| 6,343,377 B1 | 1/2002 | Gessner et al. | |
| 6,344,862 B1 | 2/2002 | Williams et al. | |
| 6,345,278 B1 | 2/2002 | Hitchcock et al. | |
| 6,381,742 B2 | 4/2002 | Forbes et al. | |
| 6,393,469 B1 | 5/2002 | Dozier et al. | |
| 6,397,264 B1 | 5/2002 | Stasnick et al. | |
| 6,421,777 B1 | 7/2002 | Pierre-Louis | |
| 6,476,828 B1 | 11/2002 | Burkett et al. | |
| 6,490,601 B1 | 12/2002 | Markus et al. | |
| 6,502,103 B1 | 12/2002 | Frey et al. | |
| 6,507,856 B1 | 1/2003 | Chen et al. | |
| 6,535,229 B1 | 3/2003 | Kraft | |
| 6,546,554 B1 | 4/2003 | Schmidt et al. | |
| 6,589,290 B1 | 7/2003 | Maxwell et al. | |
| 6,613,098 B1 | 9/2003 | Sorge et al. | |
| 6,615,276 B1 | 9/2003 | Mastrianni et al. | |
| 6,631,519 B1 | 10/2003 | Nicholson et al. | |
| 6,633,315 B1 | 10/2003 | Sobeski et al. | |
| 6,635,089 B1 | 10/2003 | Burkett et al. | |
| 6,651,217 B1 | 11/2003 | Kennedy et al. | |
| 6,654,932 B1 | 11/2003 | Bahrs et al. | |
| 6,701,486 B1 | 3/2004 | Weber et al. | |
| 6,704,906 B1 | 3/2004 | Yankovich et al. | |
| 6,720,985 B1 | 4/2004 | Silverbrook et al. | |
| 6,748,569 B1 | 6/2004 | Brooke et al. | |
| 6,763,343 B1 | 7/2004 | Brooke et al. | |
| 6,845,380 B2 | 1/2005 | Su et al. | |
| 6,848,078 B1 | 1/2005 | Birsan et al. | |
| 6,862,689 B2 | 3/2005 | Bergsten et al. | |
| 6,871,345 B1 | 3/2005 | Crow et al. | |
| 6,883,168 B1 | 4/2005 | James et al. | |
| 6,889,359 B1 | 5/2005 | Conner et al. | |
| 6,901,403 B1 | 5/2005 | Bata et al. | |
| 6,915,454 B1 | 7/2005 | Moore et al. | |
| 6,925,609 B1 | 8/2005 | Lucke | |
| 6,950,980 B1 | 9/2005 | Malcolm | |
| 6,950,987 B1 | 9/2005 | Hargraves et al. | |
| 6,957,395 B1 | 10/2005 | Jobs et al. | |
| 6,993,722 B1 | 1/2006 | Greer et al. | |
| 7,000,179 B2 * | 2/2006 | Yankovich et al. | 715/222 |
| 7,003,548 B1 | 2/2006 | Barck et al. | |
| 7,032,170 B2 | 4/2006 | Poulose | |
| 7,043,687 B2 | 5/2006 | Knauss et al. | |
| 7,058,663 B2 | 6/2006 | Johnston et al. | |
| 7,076,728 B2 | 7/2006 | Davis et al. | |
| 7,081,882 B2 | 7/2006 | Sowden et al. | |
| 7,086,042 B2 | 8/2006 | Abe et al. | |
| 7,107,539 B2 | 9/2006 | Abbott et al. | |
| 7,124,167 B1 | 10/2006 | Bellotti et al. | |
| 7,168,035 B1 | 1/2007 | Bell et al. | |
| 7,191,394 B1 | 3/2007 | Ardeleanu et al. | |
| 7,200,665 B2 | 4/2007 | Eshghi et al. | |
| 7,200,816 B2 | 4/2007 | Falk et al. | |
| 7,213,200 B2 | 5/2007 | Abe et al. | |
| 7,237,114 B1 | 6/2007 | Rosenberg | |
| 7,249,328 B1 | 7/2007 | Davis | |
| 7,281,018 B1 | 10/2007 | Begun et al. | |
| 7,284,208 B2 | 10/2007 | Matthews | |
| 7,287,218 B1 | 10/2007 | Knotz et al. | |
| 7,296,017 B2 | 11/2007 | Larcheveque et al. | |
| 7,337,391 B2 | 2/2008 | Clarke et al. | |
| 7,337,392 B2 | 2/2008 | Lue | |
| 7,346,840 B1 | 3/2008 | Ravishankar et al. | |
| 7,373,595 B2 | 5/2008 | Jones et al. | |
| 7,412,649 B2 | 8/2008 | Emek et al. | |
| 7,424,671 B2 | 9/2008 | Elza et al. | |
| 7,428,699 B1 | 9/2008 | Kane et al. | |
| 7,441,200 B2 | 10/2008 | Savage | |
| 7,496,632 B2 | 2/2009 | Chapman et al. | |
| 7,496,837 B1 | 2/2009 | Larcheveque et al. | |
| 7,543,228 B2 | 6/2009 | Kelkar et al. | |
| 7,549,115 B2 | 6/2009 | Kotler | |
| 7,584,417 B2 | 9/2009 | Friend | |
| 7,613,996 B2 | 11/2009 | Dallett et al. | |
| 2001/0016880 A1 | 8/2001 | Cai et al. | |
| 2001/0044850 A1 | 11/2001 | Raz et al. | |
| 2001/0051928 A1 | 12/2001 | Brody | |
| 2001/0056411 A1 | 12/2001 | Lindskog et al. | |
| 2002/0023113 A1 | 2/2002 | Hsing et al. | |
| 2002/0026441 A1 | 2/2002 | Kutay et al. | |
| 2002/0032768 A1 | 3/2002 | Voskuil | |
| 2002/0052769 A1 | 5/2002 | Navani et al. | |
| 2002/0053021 A1 | 5/2002 | Rice et al. | |
| 2002/0070973 A1 | 6/2002 | Croley | |
| 2002/0083145 A1 | 6/2002 | Perinpanathan | |
| 2002/0083148 A1 | 6/2002 | Shaw et al. | |
| 2002/0091738 A1 | 7/2002 | Rohrabaugh et al. | |
| 2002/0107885 A1 | 8/2002 | Brooks et al. | |
| 2002/0111699 A1 | 8/2002 | Melli et al. | |
| 2002/0111932 A1 | 8/2002 | Roberge et al. | |
| 2002/0129056 A1 | 9/2002 | Conant | |
| 2002/0152222 A1 | 10/2002 | Holbrook | |
| 2002/0152244 A1 | 10/2002 | Dean et al. | |
| 2002/0156846 A1 | 10/2002 | Rawat et al. | |
| 2002/0174417 A1 | 11/2002 | Sijacic et al. | |
| 2002/0178187 A1 | 11/2002 | Rasmussen et al. | |
| 2002/0184188 A1 | 12/2002 | Mandyam et al. | |
| 2002/0184485 A1 | 12/2002 | Dray et al. | |
| 2002/0194219 A1 * | 12/2002 | Bradley et al. | 707/506 |
| 2002/0196281 A1 | 12/2002 | Audleman et al. | |
| 2002/0198935 A1 | 12/2002 | Crandall | |
| 2003/0004951 A1 | 1/2003 | Chokshi | |
| 2003/0007000 A1 | 1/2003 | Carlson et al. | |
| 2003/0037303 A1 | 2/2003 | Bodlaender | |
| 2003/0038788 A1 | 2/2003 | Demartines et al. | |
| 2003/0038846 A1 | 2/2003 | Hori et al. | |
| 2003/0055828 A1 | 3/2003 | Koch et al. | |
| 2003/0110443 A1 * | 6/2003 | Yankovich et al. | 715/501.1 |
| 2003/0126555 A1 | 7/2003 | Aggarwal et al. | |
| 2003/0135825 A1 | 7/2003 | Gertner et al. | |
| 2003/0140160 A1 | 7/2003 | Raz et al. | |
| 2003/0172113 A1 | 9/2003 | Cameron et al. | |
| 2003/0182327 A1 | 9/2003 | Ramanujam et al. | |
| 2003/0188260 A1 | 10/2003 | Jensen et al. | |
| 2003/0189593 A1 | 10/2003 | Yarvin | |
| 2003/0200506 A1 | 10/2003 | Abe et al. | |
| 2003/0204481 A1 | 10/2003 | Lau | |
| 2003/0204511 A1 | 10/2003 | Brundage et al. | |
| 2003/0210428 A1 | 11/2003 | Bevlin et al. | |
| 2003/0218620 A1 | 11/2003 | Lai et al. | |
| 2003/0237047 A1 | 12/2003 | Borson | |
| 2004/0003031 A1 | 1/2004 | Brown et al. | |

| | | | |
|---|---|---|---|
| 2004/0010752 A1 | 1/2004 | Chan et al. | |
| 2004/0015783 A1 | 1/2004 | Lennon et al. | |
| 2004/0024842 A1 | 2/2004 | Witt | |
| 2004/0030991 A1 | 2/2004 | Hepworth et al. | |
| 2004/0039881 A1 | 2/2004 | Shoebridge et al. | |
| 2004/0039990 A1 | 2/2004 | Bakar et al. | |
| 2004/0046789 A1 | 3/2004 | Inanoria | |
| 2004/0054966 A1 | 3/2004 | Busch et al. | |
| 2004/0083426 A1 | 4/2004 | Sahu | |
| 2004/0139400 A1 | 7/2004 | Allam et al. | |
| 2004/0148514 A1 | 7/2004 | Fee et al. | |
| 2004/0148571 A1 | 7/2004 | Lue | |
| 2004/0162741 A1 | 8/2004 | Flaxer et al. | |
| 2004/0163046 A1 | 8/2004 | Chu et al. | |
| 2004/0181543 A1 | 9/2004 | Wu et al. | |
| 2004/0189708 A1 | 9/2004 | Larcheveque et al. | |
| 2004/0189716 A1 | 9/2004 | Paoli | |
| 2004/0205525 A1 | 10/2004 | Murren et al. | |
| 2004/0205571 A1 | 10/2004 | Adler et al. | |
| 2004/0205605 A1 | 10/2004 | Adler et al. | |
| 2004/0205653 A1 | 10/2004 | Hadfield et al. | |
| 2004/0216084 A1 | 10/2004 | Brown et al. | |
| 2004/0237030 A1 | 11/2004 | Malkin | |
| 2004/0268229 A1 | 12/2004 | Paoli | |
| 2005/0033626 A1 | 2/2005 | Kruse et al. | |
| 2005/0050066 A1 | 3/2005 | Hughes | |
| 2005/0060647 A1 | 3/2005 | Doan et al. | |
| 2005/0065933 A1 | 3/2005 | Goering | |
| 2005/0071752 A1 | 3/2005 | Marlatt | |
| 2005/0091305 A1 | 4/2005 | Lange et al. | |
| 2005/0108624 A1 | 5/2005 | Carrier | |
| 2005/0114764 A1 | 5/2005 | Gudenkauf et al. | |
| 2005/0149726 A1 | 7/2005 | Joshi et al. | |
| 2005/0257148 A1 | 11/2005 | Goodman et al. | |
| 2005/0268217 A1 | 12/2005 | Garrison | |
| 2006/0010386 A1 | 1/2006 | Khan | |
| 2006/0026500 A1 | 2/2006 | Qa 'Im-maqami' | |
| 2006/0031757 A9 | 2/2006 | Vincent | |
| 2006/0041838 A1 | 2/2006 | Khan | |
| 2006/0075245 A1 | 4/2006 | Meier | |
| 2006/0085409 A1 | 4/2006 | Rys et al. | |
| 2006/0107206 A1 | 5/2006 | Koskimies | |
| 2006/0129583 A1 | 6/2006 | Catorcini et al. | |
| 2006/0136422 A1 | 6/2006 | Matveief et al. | |
| 2006/0155857 A1 | 7/2006 | Feenan et al. | |
| 2006/0161559 A1 | 7/2006 | Bordawekar et al. | |
| 2006/0161837 A1 | 7/2006 | Kelkar et al. | |
| 2006/0173865 A1 | 8/2006 | Fong | |
| 2006/0184393 A1 | 8/2006 | Ewin et al. | |
| 2006/0248468 A1 | 11/2006 | Constantine et al. | |
| 2007/0005611 A1 | 1/2007 | Takasugi et al. | |
| 2007/0036433 A1 | 2/2007 | Teutsch | |
| 2007/0074106 A1 | 3/2007 | Ardeleanu et al. | |
| 2007/0088554 A1 | 4/2007 | Harb et al. | |
| 2007/0094589 A1 | 4/2007 | Paoli | |
| 2007/0100877 A1 | 5/2007 | Paoli | |
| 2007/0118538 A1 | 5/2007 | Ahern et al. | |
| 2007/0130500 A1 | 6/2007 | Rivers-Moore et al. | |
| 2007/0130504 A1 | 6/2007 | Betancourt et al. | |
| 2007/0208769 A1 | 9/2007 | Boehm et al. | |
| 2007/0276768 A1 | 11/2007 | Pallante | |
| 2008/0126402 A1 | 5/2008 | Sikchi et al. | |
| 2008/0134162 A1 | 6/2008 | James | |
| 2009/0070411 A1 | 3/2009 | Chang et al. | |
| 2009/0119580 A1 | 5/2009 | Rohrabaugh et al. | |
| 2009/0177961 A1 | 7/2009 | Fortini | |

FOREIGN PATENT DOCUMENTS

| | | | |
|---|---|---|---|
| JP | 10-2207805 | 8/1998 | |
| JP | 10207805 | 8/1998 | |
| WO | WO0157720 | 8/2001 | |

OTHER PUBLICATIONS

Altova, Altova tools for Xpath 1.0/2.0, 1-12.
IEEE International Syposium Network Computing Applications, An efficiently updatable index scheme for structured documents, 1998, 991-996.
Hoffman Michael, Architecture of Microsoft office InfoPath 2003, Jun. 2003, 1-18.
Nelson Joe, Client-side form validation using java- script, Sep. 21, 2001.
HTTP://XMLCOVERPAGES.ORG, Cover xml forms architecture, Aug. 17, 2006.
Springer- Veriag Berlin Heidelberg, Designing valid XMLI views, 2000, 467-477.
VLDB Journal, Efficient schemes for managing multiversion XML documents, 2002, 332-352.
Rees Michael, Evolving the browser towards a standard user interface architecture, 2000.
The Institution of Electrical Engineers, Flexible information presentation with xml, 1998, 6 pages.
Springer Veriag Berlin Heidelberg, Immediate and partial validation mechanism for conflict resolution of updatable operations in xml database, 2002, 387-396.
Anat Eyal, Integrating and customizing heterogeneous e- commerce applications, Aug. 2001, 16-38.
IEEE Transactions on Knowledgeable and Data Engineering, Managing complex documents over the www: a case study for XML, Jul. 1999, vol. 1, 629-938.
DOCENG '02, Managing and querying multiversion XML data with update logging, Nov. 8, 2002, 74-81.
Microsoft Corporation, Microsoft visual basic 5.0 programmer's guide, 1997, 42-58.
Stylus Studio, Stylus studio: Xpath tools, 2004-2007, 1-14.
Begun Andrew, Support and troubleshooting for XML schemas in InfoPath 2003, Aug. 2004, 1-18.
Beauchemin, Using InfoPath to create smart forms, Mar. 27, 2003.
Windows Developer Magazine, Validation with MSXML schema, Oct. 2002, 35-38.
Dubinko Micah, Xforms and Microsoft InfoPath, Oct. 29, 2003, 1-6.
Grosso et al., XML fragment interchange, Feb. 2001, 1-28.
Clark James, xml Path language (path) version 1.0, Nov. 16, 1999, 1-49.
Altova Inc., XML spy 4.0 ,manual, 1998-2001, chapters 1,2 and 6/ pp. 1-17, 18-90, 343-362.
Clark James, XSL transformations (XSLT) version 1.0, Nov. 16, 1999, 1-156.
Kay, Michael "XSL Transfornmations (XSLT) Version 2.0", http://www.w3.org/TR/2005/WD-xslt20-20050404, (04/205),1-374.
"Non Final Office Action", U.S. Appl. No. 10/942,528, (Mar. 6, 2009),31 pages.
"Non Final Offfice Action", U.S. Appl. No. 11/170,521, (Jan. 21, 2009),86 pages.
"Foreign Office Action", Application Serial No. 2,412,611, (Feb. 9, 2009),6 pages.
"Foreign Office Action", Application Serial No. 200610003709.2, (Jan. 9, 2009),8 pages.
"EP Office Action", Application Serial No. 06111546.5, (Oct. 15, 2008),5 pages.
"Notice of Re-Examination", Application Serial No. 01813138.7, (Mar. 11, 2009),27 pages.
"Non Final OA", U.S. Appl. No. 10/939,588, (Feb. 18, 2009),40 pages.
"Notice of Allowance", U.S. Appl. No. 10/404,312, (Jan. 12, 2009),12 pages.
"Final Office Action", U.S. Appl. No. 10/857,689, (Jan. 6, 2009),23 pages.
"Non Final Office Action", U.S. Appl. No. 10/977,198, (Feb. 2, 2009),15 pages.
"Non Final Office Action", U.S. Appl. No. 10/939/588, (Feb. 18, 2009),40 pages.

"Non Final Office Action", U.S. Appl. No. 10/976,451, (Feb. 23, 2009),39 pages.
"Non final Office Action", U.S. Appl. No. 11/234,767, (Feb. 26, 2009),37 pages.
"Notice of Allowance", U.S. Appl. No. 11/167,514, (Mar. 11, 2009),6 pages.
Hall, Richard S., "Agent-based Software Configuration and Development", http://www.doc.ic.ac.uk/~alw/edu/theses/hall-phd-0599.pdf on Jun. 8, 2009, Thesis of the University of Colorado,(May 1, 1999),182 pages.
"Final Office Action", U.S. Appl. No. 11/226,044, (Apr. 20, 2009),24 pages.
"Final Office Action", U.S. Appl. No. 11/056,500, (Apr. 16, 2009),10 pages.
"Final Office Action", U.S. Appl. No. 11/203,937, (May 7, 2009),13 pages.
"Non Final Office Action", U.S. Appl. No. 10/955,666, (May 7, 2009),28 pages.
"Non Final Office Action", U.S. Appl. No. 10/876,433, (Apr. 24, 2009),62 pages.
"Non Final Office Action", U.S. Appl. No. 10/916,692, (Apr. 30, 2009),14 pages.
"HP Blade Sever BH Series Operating System Guide", Hewlett-Packard, (Jul. 2002).
"Non Final Office Action", U.S. Appl. No. 09/599,809, (May 13, 2009),25 pages.
"Non FInal Office Action", U.S. Appl. No. 11/295,178, (May 27, 2009),111 pages.
"Non Final Office Action", U.S. Appl. No. 10/990,152, (May 28, 2009),19 pages.
"Final Office Action", U.S. Appl. No. 11/036,910, (Jun. 1, 2009),15 pages.
"Non Final Office Action", U.S. Appl. No. 10/857,689, (Jun. 11, 2009),25 pages.
"Final Office Action", U.S. Appl. No. 11/234,767, (Jun. 10, 2009),24 pages.
"Foreign Office Action", Application Serial No. 2002-503702, Final Notice of Rejection,(Jun. 5, 2009),212 pages.
Kaori, Iwantani et al., "Perfect Manual of Clarisworks 4.0 for Macintosh", 1st Edition, Japan,(07/297),pp. 153-167.
Noriko, Matsushita "Step-up Training of Clarisworks (tabulation), Successful Use of Spreadsheet and Tabulation", Mac People, vol. 4, No. 19,(Oct. 1, 1998),pp. 138-139.
Akihiro, Senda "Word 2000, Conservative- Looking but 'Attentive' New Function", NIKKEI PC 21, vol. 4, No. 8,(Aug. 1, 1999),pp. 115-116.
Yasuji, Fukuhara "Clarisworks, Introduction to Business Document Construction, No. 4, Estimate", Nikkei Mac, No. 14,(May 17, 1994),pp. 197-204.
Acklen, et al., "Using Corel Wordperfect 9", Que Corporation,,(1998),pp. 251-284, 424-434, 583-585.
"Final Office Action", U.S. Appl. No. 10/976,451 (Jul. 2, 2009), 22 pages.
Reagan, Moore W., et al., "Collection-based persistent digital archives", U.S. Appl. No. 60/191,662, filed Mar. 23, 2000, 133.
"Notice of Allowance", U.S. Appl. No. 11/203,937, (Aug. 31, 2009),2 pages.
"Non-Final Office Action", U.S. Appl. No. 11/567,149, (Sep. 8, 2009),5 pages.
"Final Office Action", U.S. Appl. No. 10/955,666, (Oct. 14, 2009),24 pages.
"Advisory Action", U.S. Appl. No. 10/942,528, (Oct. 26, 2009),3 pages.
"Non-Final Office Action", U.S. Appl. No. 11/557,931, (Oct. 20, 2009),27 pages.
"Non-Final Office Action", U.S. Appl. No. 10/976,451, (Oct. 29, 2009),14 pages.
"Non-Final Office Action", U.S. Appl. No. 11/227,550, (Aug. 3, 2009),10 pages.
"Notice of Allowance", U.S. Appl. No. 11/203,937, (Aug. 3, 2009),7 pages.
"Foreign Office Action", Application Serial No. 200610051554.X, (Jul. 10, 2009),11 pages.
"Non-Final Office Action", U.S. Appl. No. 11/234,767, (Aug. 12, 2009),24 pages.
"Final Office Action", U.S. Appl. No. 10/977,198, (Aug. 19, 2009),15 pages.
"Non-Final Office Action", U.S. Appl. No. 10/939,588, (Aug. 27, 2009),28 pages.
"Final Office Action", U.S. Appl. No. 11/170,521, (Sep. 8, 2009),12 pages.
"Final Office Action", U.S. Appl. No. 10/402,640, (Aug. 28, 2009),17 pages.
"Notice of Allowance", U.S. Appl. No. 11/203,937, Supplemental,(Sep. 15, 2009),2 pages.
"Final Office Action", U.S. Appl. No. 10/942 528 (Sep. 17, 2009),27 pages.
"Non-Final Office Action", U.S. Appl. No. 11/107,347, (Sep. 17, 2009),9 pages.
"Notice of Allowance", U.S. Appl. No. 10/988,720, (Sep. 17, 2009),18 pages.
"Non-Final Office Action", U.S. Appl. No. 11/044,106, (Sep. 24, 2009),17 pages.
"Final Office Action", U.S. Appl. No. 10/916,692 Nov. 16, 2009, 10 pages.
"Final Office Action", U.S. Appl. No. 11/072,087 Nov. 16, 2009, 9 pages.
"Final Office Action", U.S. Appl. No. 11/218,149 Nov. 16, 2009, 18 pages.
"Foreign Office Action", Mexican Patent Application No. PA/a/2006/002493 Sep. 14, 2009, 5 pages.
"Non-Final Office Action", U.S. Appl. No. 11/036 910 Nov. 13, 2009,9 pages.
"Notice of Allowance", U.S. Appl. No. 10/942,528 Dec. 3, 2009, 8 pages.
"Notice of Allowance", U.S. Appl. No. 10/955,665 Nov. 3, 2009, 8 pages.
"Notice of Allowance", U.S. Appl. No. 11/056,500 Dec. 2, 2009, 17 pages.
Van Hoff, Arthur et al., "The Open Software Description Format", Retrieved from: <www.w3.org/TR/NOTE-OSD> on May 18, 2009 Aug. 13, 1997, 10 pages.
"Final Office Action", U.S. Appl. No. 11/044,106, (Apr. 13, 2009), 16 pages.
"Final Office Action", U.S. Appl. No. 11/107,347, (Apr. 2, 2009), 11 pages.
"Final Office Action", U.S. Appl. No. 11/203,818, (Apr. 14, 2009), 25 pages.
"Non Final Office Action", U.S. Appl. No. 10/955,665, (Apr. 2, 2009), 15 pages.
"Non Final Office Action", U.S. Appl. No. 10/988,720, (Apr. 2, 2009), 14 pages.
"Notice of Allowance", U.S. Appl. No. 10/988,718, (Apr. 9, 2009), 13 pages.
"Restriction Requirement", U.S. Appl. No. 11/227,550, (Apr. 2, 2009), 8 pages.
"Non-Final Office Action", U.S. Appl. No. 11/170,521, (Dec. 17, 2009),11 pages.
"Notice of Allowance", U.S. Appl. No. 10/990,152, (Dec. 21, 2009),6 pages.
Honkala, Mikko et al., "Multimodal Interaction with XForms", *ICWE '06*, (2006),pp. 201-208.
"Final Office Action", U.S. Appl. No. 11/295,178 (Dec. 24, 2009),38 pages.

* cited by examiner

Merchant
*Seller of Quality Products for Twelve Years*

PURCHASE ORDER

Name: Dave
Phone: 425-555-1234

| Item Id. | Quantity | Unit Price | Total |
|---|---|---|---|
| 1756 | 17 |  | 0 |
|  |  |  | 0 |

Grand Total  0

Fig. 5

*Merchant*

*Seller of Quality Products for Twelve Years*

PURCHASE ORDER

Name: Dave
Phone: 425-555-1234

| Item Id. | Quantity | Unit Price | Total |
|---|---|---|---|
| 1756 | 17 | 299.99 | 5099.83 |
|  |  |  | 0 |

Grand Total  5099.83

Fig. 6

DATA-DRIVEN ACTIONS FOR NETWORK FORMS

TECHNICAL FIELD

This invention relates to actions for network forms.

BACKGROUND

Electronic forms are commonly used to collect information. Electronic forms may be used locally or over a communication network, such as an intranet or the Internet. For electronic forms used locally, a user's computer locally accesses view information and data information about an electronic form. With this view information, the user's computer may enable the user to view and enter data into the electronic form. With this data information, the user's computer may enable data actions for the electronic form, like validating data entered into a field, adding data from multiple fields and populating the result into another field, and the like.

For electronic forms used with a network, a user's computer communicates with a network computer to enable use of the electronic form. In so doing, often the user's network browser receives view information but not data information from the network computer. This view information may be used by the user's network browser to permit the user to view and enter information into the electronic form.

To enable data actions for the electronic form, the user's network browser often needs to communicate with the network computer for each data action. A user may, for instance, enter a price for a product in one data-entry field of a network form and a quantity of these products into another data-entry field. A data action may calculate a total price by multiplying the product's price by its quantity. To present this total price in the form, often the user's network browser sends the price and the quantity to the network computer and waits for the network computer to calculate the total, create new view information for the entire form but now including this total, and send it to the network browser. The network browser may then present the total to the user based on this new view information.

Communicating with the network computer, however, may slow the user's network browser enough to negatively affect the user's editing experience. In some cases, the network computer may take an appreciable amount of time to receive the request from the browser, perform the data action, and send new view information to the browser. Also, communicating with the network computer may be slow because of the network or how the browser communicates with it (e.g., with a dial-up modem), thereby potentially affecting a user's editing experience.

In addition, having the network computer perform data actions expends some of the network computer's resources. Expending these resources may slow or inhibit the network computer's ability to service other users.

Accordingly, this invention arose out of concerns associated with performing data actions for network forms.

SUMMARY

Systems and/or methods ("tools") are described that enable a data-driven action associated with altering a data instance of a network form without altering and/or having access to the data instance.

BRIEF DESCRIPTION OF THE DRAWINGS

FIG. 5 illustrates the view of FIG. 3 with edits.

FIG. 6 illustrates the view of FIG. 5 with an additional edit and results from performing a data-driven action.

The same numbers are used throughout the disclosure and figures to reference like components and features.

DETAILED DESCRIPTION

Overview

The following disclosure describes one or more tools enabling a data-driven action associated with altering a data instance of a network form without altering and/or having access to the data instance. In one embodiment, a tool performs a data-driven action without local access to a network form's data instance and without communicating non-locally to access the data instance, such as by a roundtrip with a network computer having the data instance.

In another embodiment, a tool renders a result of a data-driven action for a network form without transforming the network form's data instance. The tool may do so without necessitating access to and/or an alteration of the data instance. This may permit a user to edit a control in a network form and view the results of a data-driven action driven by the user's edit without requiring that the tool access or alter the network form's data instance. This may permit a user to edit the form and view the result of the action driven by that edit without waiting for a roundtrip to a network computer having the data instance. Not having to perform a roundtrip may improve a user's editing experience by making it smoother, faster, and/or more seamless. Not having to perform a roundtrip to view an action's result may also reduce the resources needed by the network computer servicing the network form.

In still another embodiment, a tool builds a relation mapping a data-driven action to an electronic form's view template. The tool may do so by transforming an action's data-centric map of an electronic form's data instance to a view-centric map of the electronic form's view template. This view-centric map may be used, for example, to enable a tool to perform the data-driven action without needing access to the network form's data instance.

Exemplary Operating Environment

Before describing the tools in detail, the following discussion of an exemplary operating environment is provided to assist the reader in understanding where and how the tools may be employed. The description provided below constitutes but one example and is not intended to limit application of the tools to any one particular operating environment.

Figure 1:
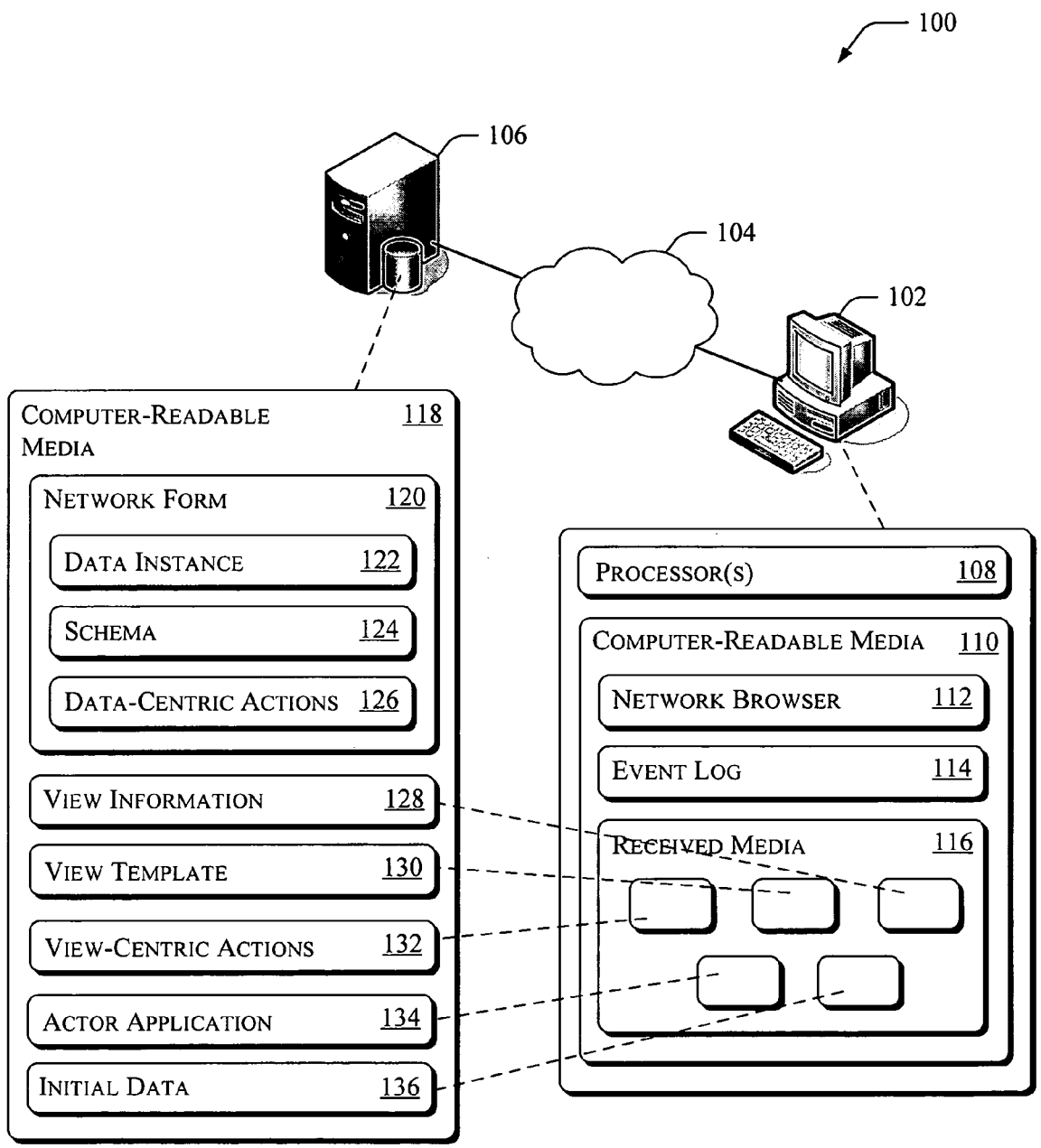
FIG. 1 illustrates an exemplary operating environment in which various embodiments can operate.

FIG. 1 illustrates one such operating environment generally at 100 comprising a computer 102, a communication network 104, and a network computer 106. The computer is shown comprising one or more processor(s) 108 and computer-readable media 110. The processor(s) are capable of accessing and/or executing the computer-readable media. The computer-readable media comprises a network browser 112, an event log 114, and received media 116. The dashed lines between the received media and media of the network computer show that these indicated media may be downloaded by the computer from the network computer.

The communication network enables communication between the computer and the network computer and may comprise one or more of an intranet, like a company's internal network, the Internet, and the like.

The network computer is shown comprising computer-readable media 118. This computer-readable media comprises a network form 120 comprising a data instance 122, a schema 124 governing the network form, and data-centric data-driven actions 126. The network form's data instance is a particular data instance of the network form; thus, if the structure or data of the network form is changed (such as by a user entering information into a view of the network form), the network form's data instance is altered at some point in time to reflect the change. The data-centric data-driven actions are actions driven by data changes in the data instance and are mapped to the data instance.

The network computer's computer-readable media is also shown comprising view information 128, a view template 130, view-centric actions 132, an actor application 134, and initial data 136. The view information, view template, view-centric actions, actor application, and initial data may be combined or separate.

The view information is information sufficient for the network browser to display an editable view of the network form. This view information may also be sufficient for the network browser and/or the actor application to display an alteration to the editable view resulting from execution of an action. In one embodiment, the view information comprises HyperText Machine Language (HTML) resulting from a transformation declared in XML Stylesheet Language Transformation (XSLT) of an extensible Markup Language (XML) embodiment of the data instance. This HTML is usable by the network browser to display the network form. Also in this embodiment, the network form's schema comprises XML Schema (XSD). This schema may comprise data-centric actions to validate the network form.

The view template comprises a view-centric logical representation of the network form. The view template's structure is, in one embodiment, one in which view information may be mapped sufficient for the actor application and/or the browser to build a view of the network form. The view template's structure may also, in another embodiment, be one in which actions are related sufficient for the actor application to perform actions in response to a user's interaction with a portion of the view template.

The view-centric actions comprise data-driven actions, which may be identified with or mapped to a position or node in the view template.

The actor application, in conjunction with or separate from the network browser, is capable of performing data-driven actions without altering and/or accessing the network form's data instance 122.

The initial data comprises stored data, such as default data. Default data may comprise, for example, values for simple fields (like date, currency, and name fields), and a number of repetitions for lists, tables, and rows. Other stored data may comprise data previously entered into the network form, such as when a form is altered, submitted, and later re-opened for viewing or further editing.

Various embodiments of these elements, and particularly an exemplary process for creating view-centric data-driven actions, are set forth in greater detail below. After describing this process, exemplary tools enabling these and other actions are described.

Data-Driven Actions

Many data-driven actions for electronic forms are related to a form's data instance, such as by being mapped to the form's data instance. But this relation may require accessing the data instance, which may be undesirable for electronic forms accessed over a network.

Figure 2:
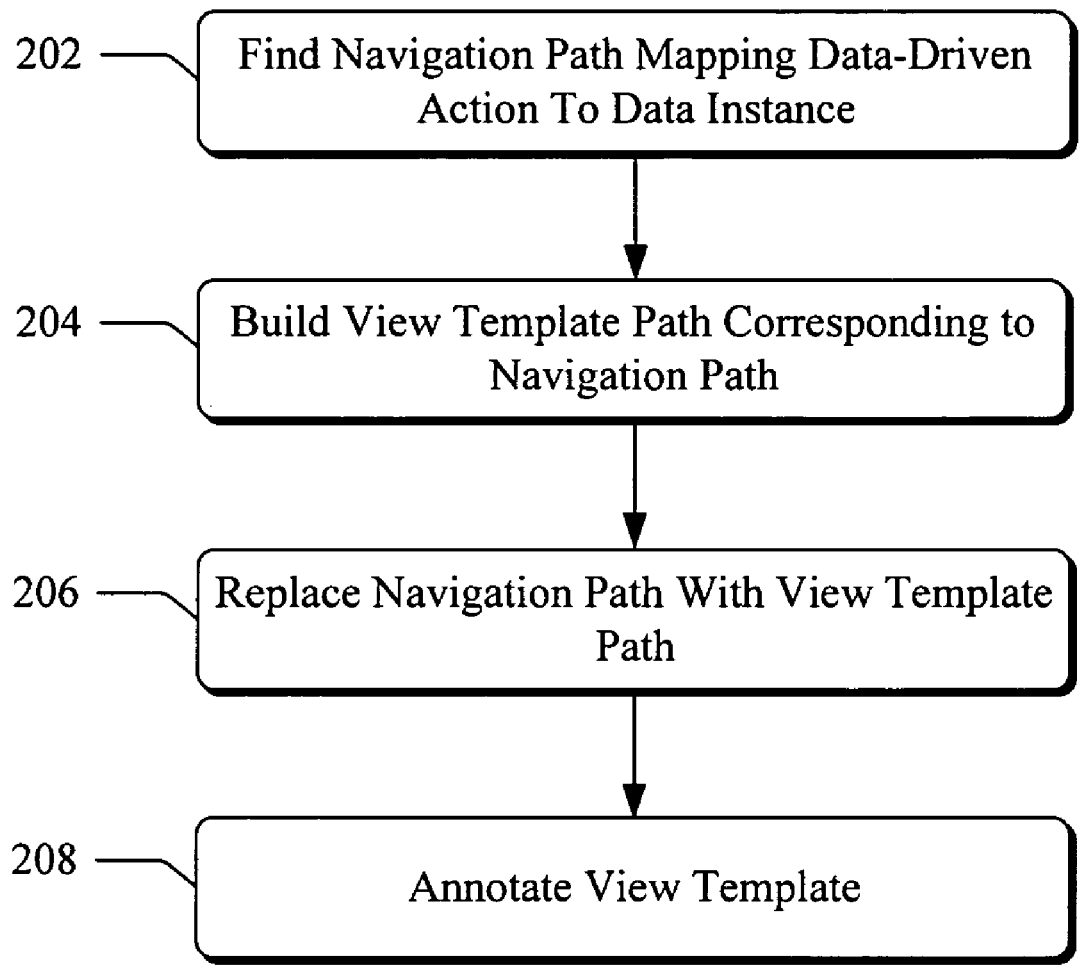
FIG. 2 is a flow diagram of an exemplary process for creating a view-centric data-driven action.

An exemplary process 200 for creating a view-centric data-driven action is shown in FIG. 2 and described below. This process creates a view-centric data-driven action by transforming an existing data-centric data-driven action having a relation to a network form's data instance to a data-driven action having a relation to the network form's view template. Process 200 is illustrated as a series of blocks representing individual operations or acts performed by elements of the operating environment 100 of FIG. 1, such as actor application 134. This and other processes described herein may be implemented in any suitable hardware, software, firmware, or combination thereof; in the case of software and firmware, these processes may represent a set of operations implemented as computer-executable instructions stored in computer-readable media 118 and executable by processor(s) of network computer 106 and/or in computer-readable media 110 and executable by processors 108.

Figure 3:
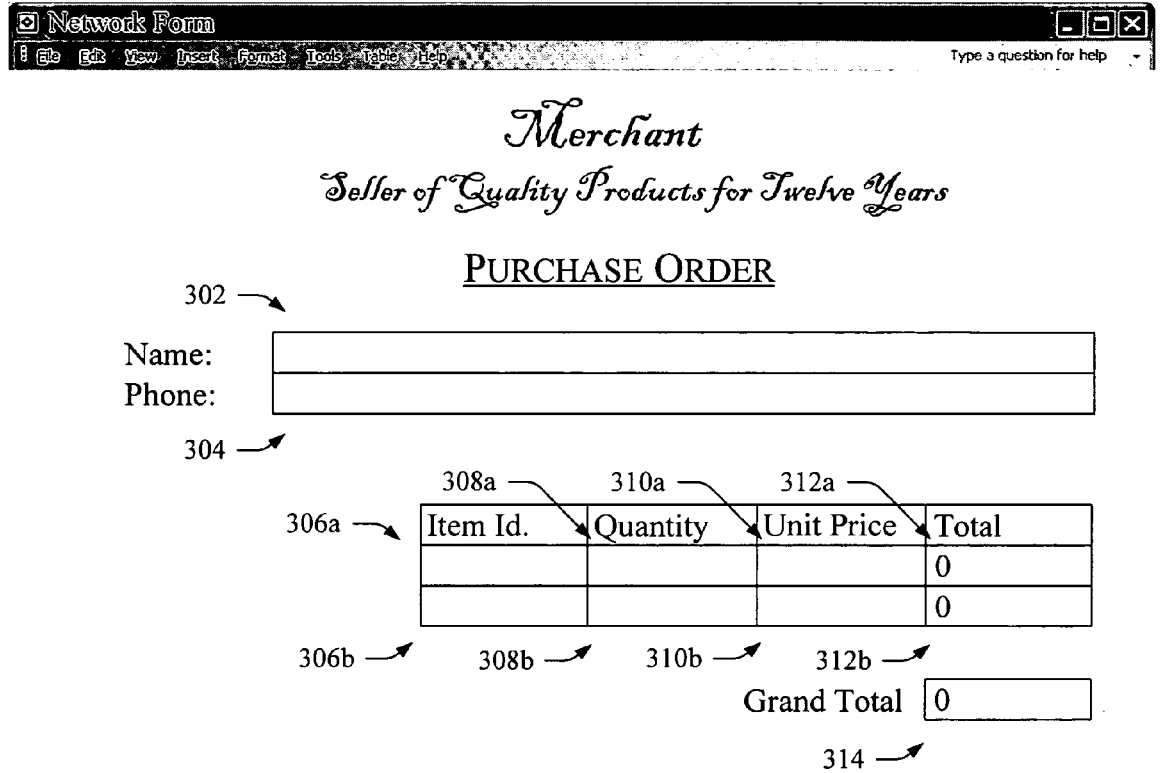
FIG. 3 illustrates an exemplary view of a network form.

To illustrate the process 200 a purchase order 300 showing an example of network form 120 is set forth in FIG. 3. In the purchase order, a view of controls are shown, here for a name field 302, a phone field 304, item fields 306a and 306b, quantity fields 308a and 308b, unit price fields 310a and 310b, total fields 312a and 312b, and a grand total field 314. The purchase order's schema, data instance, and view template are helpful in describing the process and so are set forth below.

The schema governing the data instance of the network form may be represented as:

```
root
    name
    phone
    orders
        order
            itemid
            quantity
            unitPrice
            total
    total
```

The data instance governed by this schema may be represented as:

```
<root>
    <name></name>
    <phone></phone>
    <orders>
        <order>
            <itemid></itemid>
            <quantity></quantity>
            <unitPrice></unitPrice>
            <total></total>
        </order>
        <order>
            <itemid></itemid>
            <quantity></quantity>
            <unitPrice></unitPrice>
            <total></total>
        </order>
    </orders>
    <total></total>
</root>
```

And, the view template for this form may be represented as:

```
V1 - /root
    T1 - name
    T2 - phone
    R1 - orders/order
        T1 - itemid
```

```
    T2 - quantity
        T3 - price
            T4 - total
        T3 - total
```

Returning to FIG. 2, at block 202 a tool (e.g., actor application 134) finds a relation mapping a data-driven action (e.g., one of the data-centric data-driven actions 126 of FIG. 1) to data instance 122. This relation may comprise a navigation path, such as an XML path language (XPath) expression.

Continuing the illustrated embodiment, assume that the data instance has two data-centric data-driven actions. These actions may be represented as:

```
target="/root/orders/order/total"
expression="../quantity *../unitPrice"
``` and

```
target="/root/total"
expression="sum(../orders/order/total)"
```

The first action is structured to multiply the data in the data instance's quantity node by the data in the data instance's unit price node. The second action is structured to sum all of the data in the data instance's total nodes that are child nodes to the orders node.

The navigation paths may be extracted from these data-centric data-driven actions, which in this case are XPath expressions. The tools extract the following XPaths:

/root/orders/order/total and

/root/total

As shown, these XPaths map to the data instance. The first maps to the two total nodes that are children to the "orders" node (rendered as the total fields 312a and 312b in FIG. 3). The second maps to the total node that is a child of just the root node (rendered as the grand total field 314 in FIG. 3).

At block 204, the tool builds a view template path corresponding to the navigation path. The tool may correlate the navigation path to the view template to transform the navigation path into the view template path. The tool may also compare the portion of the data instance mapped by the navigation path to the structure of the view template. If the tool finds a node of the view template that corresponds to the mapped portion of the data instance, the tool may build a view template path mapping this node.

Continuing the illustrated embodiment, the tool determines which view template node corresponds to the data instance node mapped by the navigation path. The view template may be represented as:

```
V1 - /root
    T1 - name
    T2 - phone
    R1 - orders/order
        T1 - itemid
        T2 - quantity
        T3 - price
```
```
        T4 - total
    T3 - total
```

The tool determines that the data instance node mapped by the navigation path of: "/root/orders/order/total", which is:

```
<root><orders><order><total></total>
</order></orders></root>
``` corresponds in the view template to:

V1/R1/T4

Similarly, the tool determines that the data instance node for the second data-driven action corresponds to:

V1/T3

Alternatively, the tool transforms the navigation path by determining the node of the view template corresponding to the schema node mapped by the navigation path. In some cases the structure of the schema governing the electronic form is more easily or accurately parsed, thereby making the tool's determination easier or more accurate. As shown above, correlating the schema node of "/root/orders/order/total" may be correlated to:

```
V1 - /root
    R1 - orders/order
        T4 - total
``` to find "V1/R1/T4" of the view template.

In some cases, no view template node corresponds with the data instance node mapped by the navigation path. One such case is where a data instance node to which an action is mapped is not capable of affecting the form's view. If a node of a data instance (or schema) has a related action that alters data in a node that is not viewable, for instance, then that action may not have a corresponding node in the view template.

If the tool determines that the mapped-to portion of the data instance does not have a corresponding node in the view template, the tool does not proceed. If it determines otherwise, it proceeds to block 206. In the illustrated embodiment, both of the data-centric data-driven actions are capable of affecting the view and have a corresponding node in the view template. The tool builds view template paths to these corresponding nodes.

At block 206, the tool replaces the navigation path mapping the data-driven action to the data instance with a view template path mapping the data-driven action to the view template.

Continuing the illustrated embodiment, the navigation paths for the data-driven actions are:

/root/orders/order/total and

/root/total

The tools replace these navigation paths with view template paths. Thus, the data-centric data-driven actions are transformed to view-centric data-driven actions, such as:

```
            target="V1/R1/T4"
            expression="../T2 *../T3"
``` and

```
    target="V1/T3" expression="sum( . . . /R1/T4)"
```

At block 208, the tool may, in some embodiments, annotate the view template with the data-driven action. The view template paths indicate a node or nodes of the view template to which an action is mapped. The tool may annotate these nodes to indicate that the action may be triggered by a change to these nodes. The view template may also be annotated with the action itself, thereby combining the action and the view template.

Continuing the illustrated embodiment, the tools annotate the view template with the view-centric actions:

```
            V1 - /root
                T1 - name
                T2 - phone
                R1 - orders/order
                    T1 - itemid
                    T2 - quantity
                        data_action =
                        {
                            target =
../T4
                            expression
= Multiply(Select(../T2), Select(../T3))
                        }
                    T3 - price
                        data_action =
                        {
                            target =
../T4
                            expression
= Multiply(Select(../T2), Select(../T3))
                        }
                    T4 - total
                        data_action =
                        {
                            target =
../../T3
                            expression
= Sum(Select(../R1/T4))
                        }
                T3 - total
```

This annotated view template indicates that data for the node "V1/R1/T2" (shown with the quantity field 308*a*) and "V1/R1/T3" (shown with the quantity field 310*b*) may be multiplied and the result placed in the "V1/R1/T4" node (shown with the total field 312*a*). The view template also indicates the same for each iteration of these nodes (e.g., fields 308*b*, 310*b*, and 312*b*).

The view template also indicates that data for each of nodes "V1/R1/T4" (shown as total fields 312*a* and 312*b*) may be summed and the result placed in another node, that of "V1/T3" (shown with grand total field 314).

Performing a Data-Driven Action for a Network Form

Figure 4:
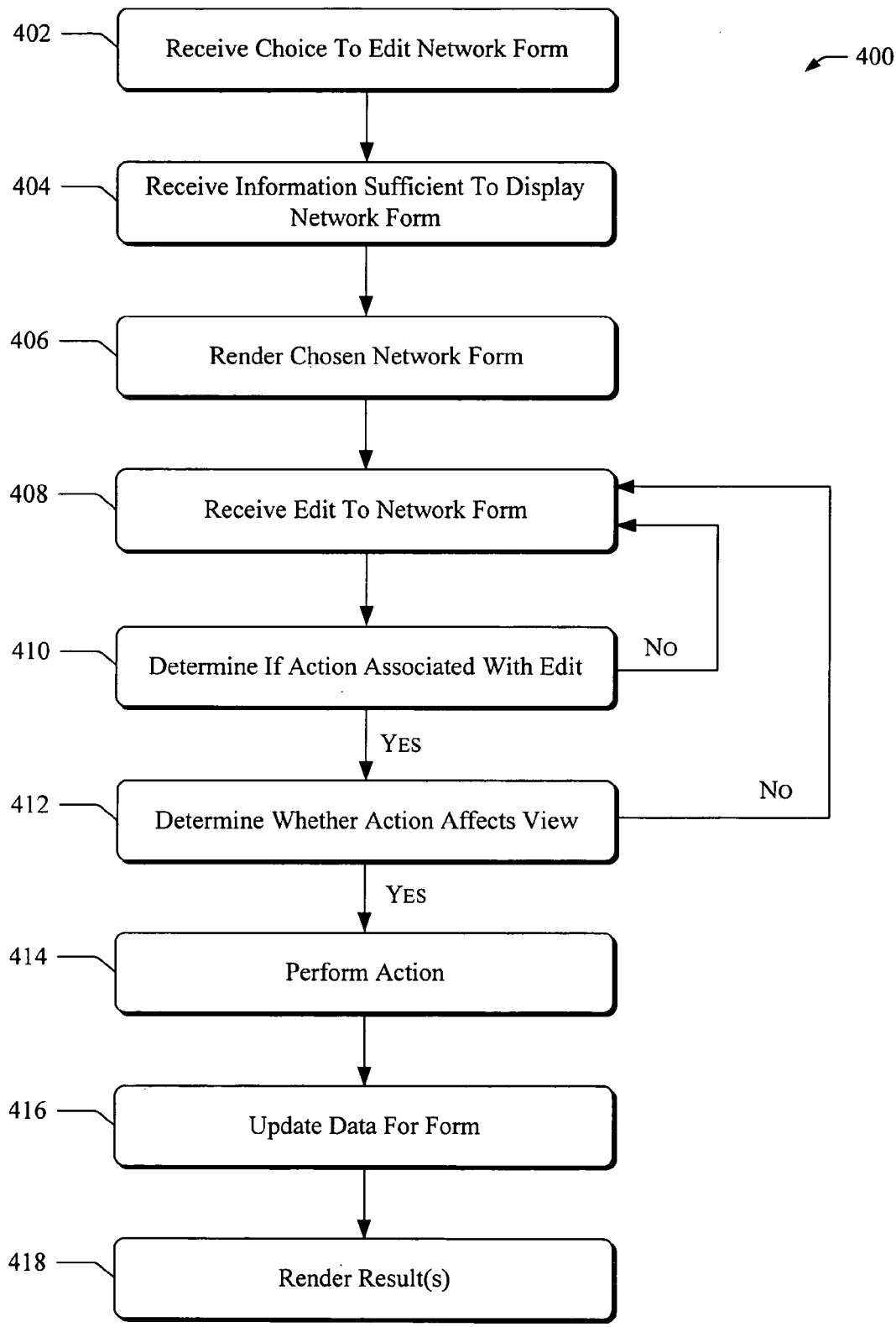
FIG. 4 is a flow diagram of an exemplary process for performing a data-driven action associated with altering a data instance of a network form and/or rendering a result of a data-driven action.

As part of an exemplary process 400 shown in FIG. 4, the tools perform data-driven actions associated with altering a data instance of a network form without altering and/or having access to the data instance. Also in this process, a tool renders a result of a data-driven action for a network form without transforming the network form's data instance. Process 400 is illustrated as a series of blocks representing individual operations or acts performed by elements of the operating environment 100 of FIG. 1, such as actor application 134.

At block 402, network browser 112 receives a user's choice to edit a network form. Assume, by way of example, that the user is browsing forms available over a network and selects to edit purchase order 300 of FIG. 3.

At block 404, the network browser receives information sufficient to enable computer 102 to display and receive edits to the network form. This information may comprise computer-readable media from network computer 106 of FIG. 1, such as view information 128, view template 130, view-centric actions 132, actor application 134, and initial data 136. With the view information and view template, the actor application and/or the network browser displays an editable view of the form.

In one embodiment, the actor application builds an editable view of the form by mapping pieces of the view information to the view template. These pieces are viewable pieces, such as HTML, which the actor application may concatenate into an overall view of the form. These view pieces may comprise, for instance, renderable HTML for data-entry fields, buttons, and other controls.

At block 406, the computer renders the network form chosen by the user. In the illustrated embodiment, the actor application renders the purchase order of FIG. 3.

At block 408, the network browser receives an edit to a control of the network form. The user may edit the form by entering data into a field, selecting a button, and the like.

Continuing the illustrated embodiment, the network browser receives data entered into name field 302. This data is pushed into the view, shown in FIG. 5.

At block 410, the actor application determines if an action is associated with the edit. In one embodiment, the actor application analyzes actions to determine if any are associated with (e.g., map to) the node edited by the user. In another embodiment, the actor application navigates the view template to find actions associated with the edit (if there are any). If there are no data-driven actions associated with the edit, the actor application returns to block 408 to receive additional edits from the user. If there are data-driven actions, the actor application proceeds to block 412 (or skips to block 414).

Continuing the illustrated embodiment, the actor application navigates the view template annotated with actions (shown above) to determine if any action is associated with "V1/T1" node (the "name node"), rendered as the name field 302 in FIGS. 3 and 5. This node does not have an action associated with it. The actor application then returns to block 408. The network browser receives other edits from the user; entry of the user's phone number into the phone field 304, shown in FIG. 5, and an item identifier into item node 306*a*, also shown in FIG. 5. These entries are also not associated with a data-driven action.

The user next enters a quantity into the quantity field 308*a*, received at block 408, and shown in FIG. 5. The actor application determines if an action is associated with this edit at block 410.

Continuing the illustrated embodiment, the actor application navigates the view template to determine if an action is associated with the received edit. The annotated view template may be represented as:

```
            V1 - /root
                T1 - name
                T2 - phone
                R1 - orders/order
                    T1 - itemid
                    T2 - quantity
                        data_action =
                        {
                            target =
../T4
```

```
                expression
    = Multiply(Select(../T2), Select(../T3))
                }
            T3 - price
                data_action =
                {
                    target =
../T4
                    expression
    = Multiply(Select(../T2), Select(../T3))
                }
            T4 - total
                data_action =
                {
                    target =
../../T3
                    expression
    = Sum(Select(../R1/T4))
                }
            T3 - total
```

The actor application navigates this view template and determines that the following data-driven action is associated with the user's edit to the quantity node:

```
                data_action =
                {
                    target =
../T4
                    expression
    = Multiply(Select(../T2), Select(../T3))
                }
```

At block 412, the actor application determines whether or not performing the associated action will affect the view. Alternatively, the actor application may skip block 412 to block 414.

The actor application may determine if the action will affect the view by navigating the view template to determine which nodes of the view template may be changed by performing the action.

In the ongoing embodiment, the actor application determines that the data-driven action associated with the quantity node multiplies data in the "V1/R1/T2" node by the data in the "V1/R1/T3" node, and places this result in the target node "V1/R1/T4". Thus, the data "17" in quantity field 308a is multiplied by no data (zero) in the unit price field 310a, the result of which ("0") is to be placed in the total field 312a. In this case, the result of performing the action does not change the view. The total field 312a already has a zero. In this case the actor application may forgo performing the action associated with this quantity node and/or other actions, such as updating data for the form (i.e., do not perform block 416) and rendering the results of performing this action (i.e., do not perform block 418). If the actor application forgoes performing the action and/or these other actions, it returns to block 408.

Returning to block 408, the network browser receives another edit, this time entry of a unit price to the unit price field 310a. The price is shown in FIG. 6 at field 310a ("299.99").

The actor application then determines at block 410 that the action is associated with the edit. Continuing the illustrated embodiment, the actor application navigates the view template annotated with actions (shown above) and determines that an action is associated with "V1/R1/T3" node (the "price" node).

Navigating the view template given above, the actor application determines that the following data-driven action is associated with the user's edit to the price node:

```
                data_action =
                {
                    target =
../T4
                    expression
    = Multiply(Select(../T2), Select(../T3))
                }
```

The actor application then determines that the action will affect the view. It does so by navigating the view template to determine which nodes of the view template may be changed by performing the action.

In the ongoing embodiment, the actor application determines that the data-driven action associated with the quantity node multiplies data in the "V1/R1/T2" node by the data in the "V1/R1/T3" node, and places this result in the target node "V1/R1/T4". Thus, the data "17" shown in quantity field 308a is multiplied by "299.99" shown in unit price field 310a, the result of which may be different that the zero currently rendered in the total field 312a.

At block 414 the actor application performs the action without accessing and/or altering the form's data instance. In this exemplary process, the actor application uses the view template rather than a data instance, thereby freeing the actor application from having to access or alter the form's data instance. The actor application may perform the data-driven action, in some cases, without any non-local communication, thereby potentially improving the user's editing experience. In one embodiment, the actor application performs the action by executing an expression and locating a node of the view template into which the result may be rendered.

In the ongoing embodiment, the actor application multiplies the data entered into the quantity field, "17", by the data entered into the unit price field "299.99", for a result of "5099.83".

At block 416, the actor application updates the data for the form. This data for the form may be locally stored, which may permit fewer roundtrips to the network computer. In the ongoing embodiment, the actor application updates the zero for the first total node (rendered as the total field 312a) with the result "5099.83". The actor application may proceed directly to block 418 to render this result in the view, but may also first determine if this data change triggers any other actions. If so, the actor application may perform all of the triggered actions (some actions may trigger another action, which triggers another action, and so forth) before rendering the different actions' results.

Similarly to block 408, 410, 412, and 414, the actor application may proceed to receive data (e.g., a result from a performed action), determine in the node into which the data is received is associated with an action, determine if that action may affect the view, and perform the action. Thus, the actor application in the ongoing embodiment receives the result of the action performed above to the total node. The actor application may then determine whether or not the node to which this "edit" is made (e.g., a result automatically received from performance of the action) has another action associated with it. If so, it may then determine whether or not performing that other action will affect the view, and if so, may then perform the other action.

In the ongoing embodiment, the actor application determines that the result for the total node has another associated action. This action may be represented as:

```
           data_action =
               {
                       target =
   ../../T3
                       expression
     = Sum(Select(../R1/T4))
               }
```

Thus, the total node ("V1/R1/T4") has an associated data-driven action. This action sums the data of the total node and all other total nodes. The result of this summation is then targeted for the "V1/T3" total node (rendered as the grand total field 314).

The actor application next determines that performing this summation action may affect the view. The actor application performs this action, summing the data of the first and second total nodes, which are "5099.83" and "0", for a result of "5099.83".

The actor application may record this data entered into and resulting from actions, such as in a locally stored hierarchically structured data tree or event log 114. The data tree, with the data and results of the ongoing embodiment, may be represented as:

```
       (V1)
       (Dave, T1)
       (425-555-1234, T2)
           (R1_1)
               (1756, T1)
               (17, T2)
               (299.99, T3)
               (5099.83, T4)
           (R1_2)
               (, T1)
               (, T2)
               (, T3)
               (, T4)
       (5099.83, T3)
```

At block 418 the actor application and/or network browser renders the result of the data-driven action(s) performed without transforming the form's data instance. The actor application may also, in another embodiment, render changes to the view without accessing or altering the data instance.

The actor application may keep track of which controls in the view need to be updated by marking nodes associated with these controls, and then rendering each of these nodes for new data once all of the actions have been performed (but with results being rendered).

Alternatively, the actor application may re-render all of the form, though this may take additional time or resources compared with selective re-rendering.

To selectively re-render parts of the view, the actor application may determine which of the pieces of information from view information 128 of FIG. 1 are associated with the nodes of the view template that have been changed, such as by marking these nodes dirty. For the above view template, the marked nodes are "V1/R1_1/T4" and "V1/T3". The actor application may then push the results into these pieces of the view or re-render each of these pieces with the results added.

As shown in FIG. 6, the view of the purchase order shows the user the results of data-driven actions. These results, shown in the total field 312a and the grand total field 314, are accurate renderings of how the view may look if the data-driven actions were instead associated with the data instance. Thus, this view may be identical to the view shown by placing the results of these actions into a data instance, transforming the data instance, and rendering the transformation.

In some cases, however, a data-driven action may require communication across a network, such as to access a data instance for the form or a database having data needed to perform an action (e.g., validation of entered data against data in a database). In these cases, the actor application may access the network, thereby forgoing many of the blocks of process 400.

The actor application and/or network browser may record the user's edits and/or the results of performing various actions. This record of edits and/or results may be sent to network computer 106, such as when sending it will not appreciably hinder a user's editing experience, or on submittal by the user.

The network computer, responsive to receiving this event log, alters the data instance of the network form. It may do so infrequently, thereby potentially reducing the resources needed to service the network form.

For the ongoing illustration, the actor application records the user's edits to the view into event log 114 and communicates this event log to the network computer. The network computer updates data instance 122 with information from the event log. The data instance represented above at the beginning of the description relating to FIG. 2 may be changed by the network computer using the event log, in this case to:

```
   <root>
       <name>Dave</name>
       <phone>425-555-1234</phone>
       <orders>
           <order>
               <itemid>1756</itemid>
               <quantity>17</quantity>
   <unitPrice>299.99</unitPrice>
               <total>5099.83</total>
           </order>
           <order>
               <itemid></itemid>
               <quantity></quantity>
               <unitPrice></unitPrice>
               <total></total>
           </order>
       </orders>
       <total>5099.83</total>
   </root>
```

CONCLUSION

Systems and/or methods are described that enable a data-driven action associated with altering a data instance of a network form without altering and/or having access to the data instance. Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A system comprising:
   one or more processors;
   one or more computer-readable media storing computer-readable instructions therein that, when executed by the one or more processors, cause the system to perform acts including:
   obtaining, over a network from a server configured to maintain a data instance of a network form, a downloaded data instance of the network form;

rendering an editable view of the network form, the editable view of the network form being derived at the computing device from the downloaded data instance of the network form by:
- extracting one or more navigation paths configured to map one or more data-centric data driven actions to the data instance; and
- transforming the one or more data-centric data driven actions to corresponding view-centric data driven actions to enable data-driven actions through the editable view of the network form by replacing the extracted one or more navigation paths with corresponding view template paths to map the one or more data-centric data-driven actions to a view template;

receiving data through the editable view of a network form, the data capable of driving an action associated with the data instance of the network form maintained at the server if the data alters the data instance; and performing the action through the editable view of the network form using a corresponding said view-centric data driven action without altering the data instance maintained at the server.

2. The system of claim 1, further comprising determining which node of a view-centric logical representation of the network form the data is associated with, and wherein the act of performing the action comprises performing the action associated with the node.

3. The system of claim 1, wherein the act of performing the action is performed without accessing the data instance following the act of receiving the data.

4. The system of claim 1, further comprising determining that the data is capable of driving the action.

5. The system of claim 1, further comprising determining if a result of the action is capable of driving another action associated with the data instance if the result alters the data instance and, if the result of the action is capable of driving another action, performing the other action without altering the data instance.

6. The system of claim 1, further comprising rendering a result of the act of performing the action without transforming the data instance.

7. The system of claim 1, further comprising updating locally stored data for the network form with a result of the act of performing the action.

8. The system of claim 1, further comprising determining if a result of performing the action is capable of altering the editable view.

9. The system of claim 1, wherein the action comprises a validation operation.

10. One or more computer-readable media storing computer-readable instructions therein that, when executed by a computing device, cause the computing device to perform acts comprising:
- obtaining, over a network from a server configured to maintain a data instance of a network form, a downloaded data instance of the network form;
- outputting an editable view of the network form, the editable view of the network form derived at the computing device from the downloaded data instance of the network form by:
  - determining one or more navigation paths to map one or more data-centric data-driven actions to the data instance;
  - extracting the one or more navigation paths; and
  - transforming the one or more data-centric data driven actions to corresponding view-centric data driven actions to enable data-driven actions through the editable view of the network form by replacing the extracted one or more navigation paths with corresponding view template paths to map the one or more data-centric data-driven actions to a view template;
- receiving a result of a said data-driven action for the network form that is performed through the editable view of the network form using a said view-centric data driven action; and
- rendering the result of the data-driven action in the editable view of the network form without altering the network form's data instance maintained at the server.

11. The media of claim 10, further comprising performing the data-driven action without altering the network form's data instance.

12. The media of claim 10, wherein the act of rendering is performed without accessing the network form's data instance.

13. The media of claim 10, wherein the acts of receiving and rendering are performed without a roundtrip to a network computer having the network form's data instance.

14. The media of claim 10, wherein the act of rendering the result comprises re-rendering a portion of the editable view associated with a node having the result.

15. The media of claim 10, further comprising marking a node of a view-centric logical representation of the network form that is associated with the result and wherein the act of rendering the result comprises re-rendering the node.

16. A method performed by a client computing device comprising:
- obtaining, over a network from a server configured to maintain a data instance of a network form, a downloaded data instance of the network form;
- outputting an editable view of the network form, the editable view of the network form derived at the computing device from the downloaded data instance of the network form by:
  - determining one or more navigation paths to map one or more data-centric data-driven actions to the data instance;
  - extracting the one or more navigation paths;
  - transforming the one or more data-centric data driven actions to corresponding view-centric data driven actions to enable data-driven actions through the editable view of the network form by replacing the extracted one or more navigation paths with corresponding view template paths to map the one or more data-centric data-driven actions to a view template;
- receiving a result of a said data-driven action for the network form that is performed through the editable view of the network form using a said view-centric data driven action; and
- rendering the result of the data-driven action in the editable view of the network form without altering the network form's data instance maintained at the server.

* * * * *